M. MARKARIAN.
REVERSIBLLE CAR AXLE COUPLING.
APPLICATION FILED DEC. 24, 1908.

934,003.

Patented Sept. 14, 1909.

Witnesses:—

Inventor.
Melkon Markarian
by Townsend & Hackley
attys

ANDREW. B. GRAHAM CO., PHOTO-LITHOGRAPHERS, WASHINGTON, D. C.

UNITED STATES PATENT OFFICE.

MELKON MARKARIAN, OF FRESNO, CALIFORNIA.

REVERSIBLE CAR-AXLE COUPLING.

934,003. Specification of Letters Patent. Patented Sept. 14, 1909.

Original application filed August 18, 1908, Serial No. 449,156. Divided and this application filed December 24, 1908. Serial No. 469,162.

*To all whom it may concern:*

Be it known that I, MELKON MARKARIAN, a citizen of the United States, residing at Fresno, in the county of Fresno and State of California, have invented a new and useful Reversible Car-Axle Coupler, of which the following is a specification.

This application is a division from a former application of mine on reversible car axle coupler, filed August 18th, 1908, Serial No. 449,156, and relates to a construction for a car axle whereby the twisting strain exerted on the axle in going around curves is avoided, thereby obviating the necessity of lubricating the track, as there is no squeak, and wear is greatly reduced.

Figure 1:
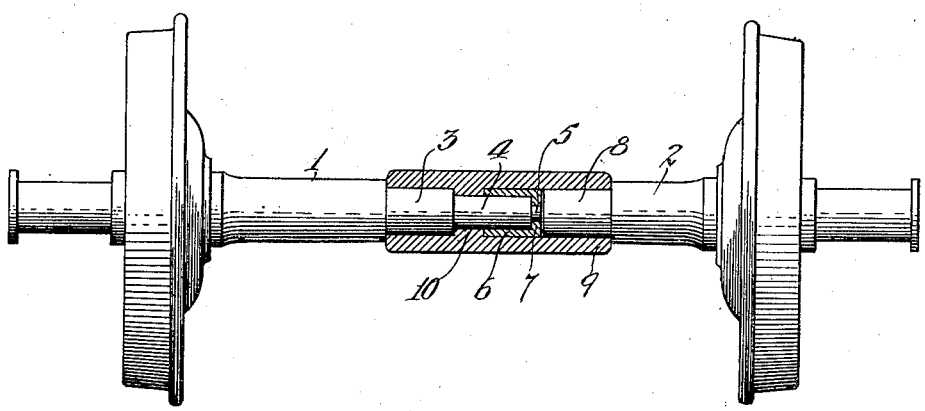
Figure 2:
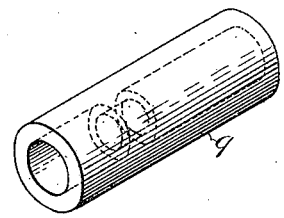
Figure 3:

The accompanying drawings illustrate the invention, and referring thereto:—Figure 1 is a front elevation of a car axle partly in section. Fig. 2 is a perspective view of the outer collar, and Fig. 3 is a perspective view of the bushing.

1 and 2 designate the two sections of the car axle, and the section 1 has a reduced end portion 3 and a still smaller reduced portion 4, and a third smaller portion 5. Driven on the axle portion 4 is a bushing 6, shown in detail in Fig. 3, and having an end flange 7 which takes against the end of the reduced portion 4 and also receives the smallest reduced portion 5. The axle section 2 has a reduced end portion 8 on which is driven an outer sleeve or collar 9, the latter having an internal flange 10 which lies between the bushing 6 and the end of the reduced portion 3, the flange 10 serving to lock the two sections of the axle together. The axle section 2 and sleeve 9 revolve together as one piece, while the axle section 1 and bushing 6 revolve together as one piece, the bushing 6 having a journal fit within the collar 9.

It will be evident that with this invention when a car is rounding a curve the outer wheel will be enabled to rotate faster than the inner wheel on account of the differential movement permitted. Inasmuch as each wheel is permitted to travel at its natural speed around the curve, all unnecessary friction between the wheels and track is avoided and all tortional strain on the axle is eliminated.

The independent movement of the wheel also relieves friction on the rail and enables an increase of speed of the car and permits a greater tonnage to be hauled.

The device can readily be applied to all axles, is very simple of construction, of economical manufacture and of great durability.

What I claim is:—

A differential car axle comprising two axle sections, one of which has a stepped end of three diameters, a bushing rigid on the intermediate step and having an end flange which engages the step of least diameter, another axle section having a reduced end, a collar fastened on the latter reduced end, said collar having an internal flange which has a journal fit on the intermediate step and abuts said bushing.

In testimony whereof, I have hereunto set my hand at Fresno, California, this 17th day of December, 1908.

MELKON MARKARIAN.

In presence of—
L. A. WHARTON,
E. V. ANDERSON.